United States Patent
Viudez Moreiras et al.

(10) Patent No.: US 9,665,075 B2
(45) Date of Patent: May 30, 2017

(54) GUIDANCE SYSTEM BY CONTROL OF DERIVATIVE

(75) Inventors: Daniel Viudez Moreiras, Madrid (ES);
Antonio Nevado Reviriego, Madrid (ES); Juan Manuel Martin Sanchez, Madrid (ES)

(73) Assignee: UNIVERSIDAD NACIONAL DE EDUCACION A DISTANCIA, Madrid (ES)

(*) Notice: Subject to any disclaimer, the term of this patent is extended or adjusted under 35 U.S.C. 154(b) by 525 days.

(21) Appl. No.: 14/127,003

(22) PCT Filed: May 4, 2012

(86) PCT No.: PCT/ES2012/070314
§ 371 (c)(1),
(2), (4) Date: Mar. 4, 2014

(87) PCT Pub. No.: WO2013/001119
PCT Pub. Date: Jan. 3, 2013

(65) Prior Publication Data
US 2014/0207257 A1    Jul. 24, 2014

(51) Int. Cl.
*G05B 13/04*    (2006.01)
*G05D 1/00*    (2006.01)

(52) U.S. Cl.
CPC ........... *G05B 13/04* (2013.01); *G05B 13/048* (2013.01); *G05D 1/00* (2013.01)

(58) Field of Classification Search
CPC ...... G05B 13/048; G05B 13/04; G05B 11/42; G05B 13/042; G05B 2219/42058;
(Continued)

(56) References Cited

U.S. PATENT DOCUMENTS 4,197,576 A    4/1980    Sanchez
4,358,822 A    11/1982    Sanchez
(Continued)

FOREIGN PATENT DOCUMENTS

ES    460649    5/1978
ES    2206315    5/2004

OTHER PUBLICATIONS

Slegers et al., Nonlinear Predictive Control Technqiue for Unmanned Air Vehilces, Journal of Guidance Control and Dynamics, vol. 29, No. 5, Sep.-Oct. 2006.*
(Continued)

*Primary Examiner* — Darrin Dunn
(74) *Attorney, Agent, or Firm* — Hauptman Ham, LLP

(57) ABSTRACT

Guidance System for controlling output variables of single-input single-output or multi-input multi-output processes, where the process parameters are known or unknown and time-varying. The guidance system of the present invention generates a desired trajectory for a process output variable, and based on said desired trajectory, computes a set point for the derivative variable of said process output variable. This set point is then applied to a model based advanced controller for said derivative variable and the control action generated by said model based advanced controller is applied to the process and guides the process evolution in such a way that said process output variable converges towards said desired trajectory.

5 Claims, 4 Drawing Sheets

(58) Field of Classification Search
CPC .......... G05B 2219/33034; G05B 2219/39289; G05B 2219/39298; G05B 13/00; G05B 13/026; G05B 13/027; G05B 19/404; G05B 19/406

See application file for complete search history.

(56) References Cited

U.S. PATENT DOCUMENTS

| | | | |
|---|---|---|---|
| 6,662,058 B1 | 12/2003 | Sanchez | |
| 6,839,598 B2* | 1/2005 | Yasui | G05B 13/047 700/1 |
| 7,987,145 B2* | 7/2011 | Baramov | G05B 13/048 706/21 |
| 2004/0088059 A1* | 5/2004 | Johnson | G05B 13/027 700/28 |
| 2004/0093124 A1* | 5/2004 | Havlena | G05B 13/026 700/291 |
| 2004/0230325 A1* | 11/2004 | Ramamoorthy | G05B 13/042 700/37 |
| 2005/0107895 A1* | 5/2005 | Pistikopoulos | G05B 17/02 700/52 |
| 2006/0129250 A1* | 6/2006 | Yasui | F02D 35/0007 700/19 |
| 2006/0224534 A1* | 10/2006 | Hartman | G05B 13/027 706/15 |
| 2006/0241786 A1* | 10/2006 | Boe | G05B 13/048 700/29 |
| 2007/0156259 A1* | 7/2007 | Baramov | G05B 13/048 700/44 |
| 2009/0265021 A1* | 10/2009 | Dubay | G05B 13/04 700/33 |
| 2012/0035748 A1* | 2/2012 | Gahinet | G05B 11/32 700/31 |

OTHER PUBLICATIONS

Martin-Sanchez, Implementation of an Adaptive Autopilot Scheme for the F-8 Aircraft using the Adaptive Predictive Control System, Proc. 13th Annual Asilomar Conf. on Circuits, Systems, and Computers, Asilomar, Pacific Grove, CA 606-611, 1980.*

Sanchez, Juan Martin, "Implementation of an adaptive autopilot scheme for the F-8 aircraft using the adaptive-predictive control system," Conference Record of the Thirteenth Asilomar Conference on Circuits, Systems & Computers, 1979, pp. 606-609.

Martinez, I.G. et al., "Adaptive predictive control applied to a flight control system," XVIII Congreso Brasileno of Automatica, 2010, <http://www.labplan.ufsc.br/congressos/CBA2010/Artigos/66159_1.pdf>.

* cited by examiner

US 9,665,075 B2

GUIDANCE SYSTEM BY CONTROL OF DERIVATIVE

BACKGROUND OF THE INVENTION

The invention is related to a guidance system for controlling output variables of single-input single-output or multi-input multi-output processes by controlling their derivative variables in such a way that the control performance obtained for said output variables is improved for the high range of control frequencies, i.e. for the range of small control periods with respect to process dynamics.

Such a guidance system is useful in many diverse fields such as aeronautics, naval, nuclear, automation and, in general, in industry. Examples of processes in which the guidance system can be applied are an aircraft where the pitch angle is controlled by elevator position, and a boat where the roll angle is controlled by fin stabilizers.

It is known that Model Based Advanced Controllers use a process cause-effect relationship or prediction model to predict the process output variables evolution. The reliability of said prediction depends on the value of the prediction model parameters. Some solutions require computing the predictive model before it is used in the control system; this is the case of the so called Model Based Predictive Control techniques.

In order to take into account the time-varying nature of processes, other so called Adaptive solutions generate the predictive model in real time at the same time that this model is used to control the process, in such a way that the changes that may happen in the process dynamics can rapidly be incorporated into the predictive model by means of an adaptation mechanism or by a change in the domain of operation. This is the case of the Adaptive Predictive controllers (U.S. Pat. Nos. 4,197,576 and 4,358,822) and the Adaptive Predictive Expert controllers (U.S. Pat. No. 6,662,058 B1).

In both cases, the value of the predictive model parameters depends on the control period. Thus, the setting of the control period is important to ensure that the value of the predictive model parameters lie in a range appropriate to predict reliably the evolution of the process output variables under control. It is known that the choice of the control period below a certain threshold of time, that may be called "modeling threshold", which is relatively small with respect to the natural time response of the process output variable under control, makes the value of the predictive model parameters approach the zero value too sharply. This makes these parameters increase their sensitivity to any small identification error in their value and, therefore, the use of said parameters value in the prediction of the evolution of the process output variable and in the computation of the control signal to be applied to the process, may significantly deteriorate the controller performance.

However, the practical application of a control system for a certain process output variable may in many cases require the use of a control period below said modeling threshold and, therefore, the performance of model based advanced controllers, adaptive or non adaptive, may, under said control period, deteriorate significantly. For instance, the appropriate control period to be used in the application of a model based advanced controller for the pitch angle of an aircraft acting on the elevator position, should not be smaller than a tenth of a second, while the control period required must be lower than 5 cents of a second to ensure the integrity of the human pilot.

The guidance system of the present invention allows the use of control periods below the previously mentioned modeling threshold improving for these control periods the control system performance obtained by the direct application of model based advanced controllers.

BRIEF DESCRIPTION OF THE INVENTION

The guidance system of the present invention uses a digital computer, a guidance block and a model based advanced controller to guide the evolution of a process output variable by controlling its derivative variable in such a way that the guidance block generates a desired trajectory for said process output variable and also, from this desired trajectory, computes a set point value for said derivative variable to be applied to said model based advanced controller, which generates a control signal that when applied to the process, guides said derivative value towards said set point and, as a consequence, said process output variable converges towards said desired trajectory, and this is done at every sampling or control instant by a number of simple and specific operations.

BRIEF DESCRIPTION OF THE DRAWINGS

The implementation of the invention will be described in a general way with reference to the accompanying figures, following this the results of a particular application of the guidance system will be shown.

DETAILED DESCRIPTION OF THE INVENTION

Figure 1:
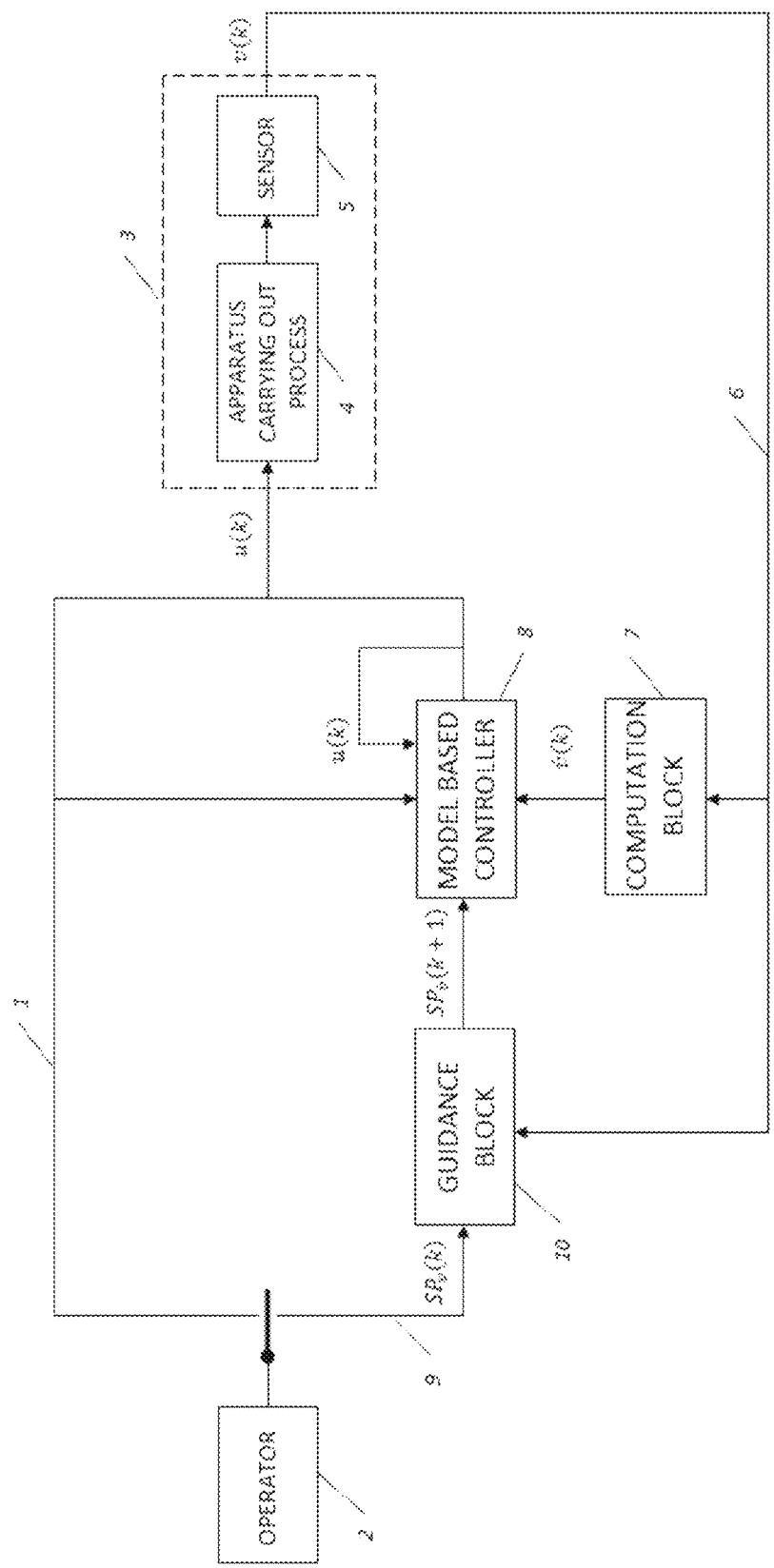
FIG. 1 shows the general and conceptual structure of the guidance system.

At any control instant k, the operator may choose to apply manual control or automatic control to the process variable; both modes of control are shown in FIG. 1 and are described as follows:

1. Manual control: Under manual control, the control signal u(k) is directly applied from the operator 2 to the apparatus 4 carrying out the process being controlled and to the model based advanced controller 8 as shown by path 1. A sensor 5 associated to apparatus 4 measures the process output variable v(k) to be controlled. This process output variable v(k) is applied, as shown by path 6, to computation block 7 and guidance block 10. Computation block 7 computes the increment between two successive control instants, k and k−1, of the process output variable v(k) and from this increment generates the named derivative variable v̇(k)

which is applied, as variable to be controlled, to the model based advanced controller 8. Thus, under manual control, the model based advanced controller 8 can operate in the identification mode described for this type of controller in U.S. Pat. Nos. 4,197,576, 4,358,822 and U.S. Pat. No. 6,662,058 B1.

2. Automatic control: Under automatic control, the desired value $SP_v(k)$ for the process output variable $v(k)$ is directly applied from the operator 2 to the guidance block 10, as shown by path 9. Likewise, the measured process output variable $v(k)$ is applied to the guidance block 10 from the sensor 5 as shown by path 6. From the process output variable $v(k)$ and its desired set point $SP_v(k)$, the guidance block 10 will generate a desired set point value $SP_{\dot{v}}(k+1)$ for the derivative variable $\dot{v}(k)$. From this desired set point value $SP_{\dot{v}}(k+1)$ and the derivative variable $\dot{v}(k)$, the model based advanced controller 8, under automatic mode, computes the control signal $u(k)$ to be applied to apparatus 4 carrying out the process being controlled.

The specific operations that the guidance system will carry out at every control instant k to automatically control the process output variable $v(k)$ are described as follows:

(a) Measurement (by sensor 5) and, if it is considered convenient, filtering of the output variable of the process carried out by apparatus 4 to obtain the process output variable $v(k)$ to be controlled.

(b) Computation of the derivative variable $\dot{v}(k)$ (in computation block 7) by:

$$\Delta v(k) = v(k) - v(k-1) \qquad (1)$$

$$\dot{v}(k) = F(\Delta v(k)) \qquad (2)$$

where $\Delta v(k)$ is the increment of $v(k)$ between control instants $k-1$ and $k$, and F is a conveniently chosen function of $\Delta v(k)$ that returns the value of the derivative variable $\dot{v}(k)$. A particular choice of function F, which will be used in the application example of this document, is the identity function that will make $\dot{v}(k)$ equal to $\Delta v(k)$.

(c) Computation (by guidance block 10) of the set point value $SP_{\dot{v}}(k+1)$ to be applied at instant k to the model based advanced controller for the derivative variable $\dot{v}(k)$. This set point value is computed and updated periodically at updating instants t which are a subset of control instants characterized by the fact that two consecutive updating instants are separated by an updating period equal to q control periods, with $q \geq 1$. Said computation is performed at each updating instant t in accordance with the following two steps:

1. Computation of the value at instant t+1, $v_d(t+1)$, of a desired output trajectory to guide the process output variable $v(t)$ towards its set point, $SP_v(t)$, along the successive updating instants. This computation can be performed as follows:

(A) This desired output trajectory can be generated by $$v_d(t+j) = \sum_{i=1}^{r} \alpha_i v_d(t+j-i) + \sum_{i=1}^{s} \beta_i SP_v(t+j-i) \qquad (3)$$

where $v_d(t+1-i) = v(t+1-i), i=1, r$

Thus, the values of the desired output trajectory $v_d(t+j)$, $j \geq 1$, can be computed at updating instant t using (3) from the previous values of the process output variable v in the interval [t, t+1−r] and the parameters $\alpha_i$ (i=1, r) and $\beta_i$ (i=1, s). These parameters and the integers r and s, can be chosen by the operator in order to make this desired output trajectory converge in the desired manner towards the set point value $SP_v(t+j-1)$ which is generated directly by the operator. In general, $SP_v(t+j-1) = SP_v(t)$, for all $j \geq 1$ and this will be assumed in the following. In this case the value $v_d(t+1)$ is computed by (3) for j=1, i.e. it will be computed by $$v_d(t+1) = \sum_{i=1}^{r} \alpha_i v_d(t+1-i) + \sum_{i=1}^{s} \beta_i SP_v(t+1-i) \qquad (4)$$

Figure 2:
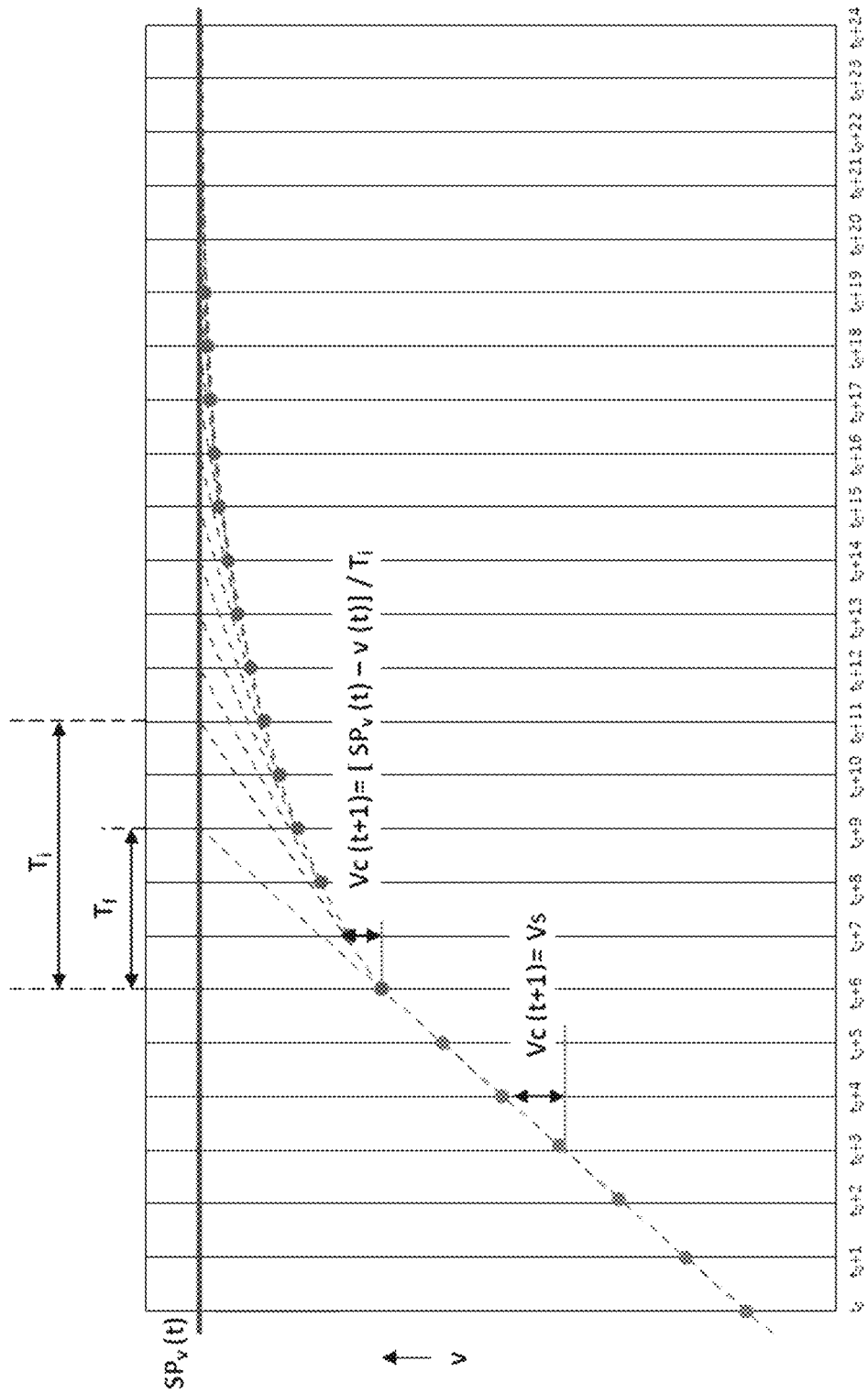
FIG. 2 illustrates graphically, by means of a conceptual example, the evolution of a process output variable that tracks the desired output trajectory generated by a guidance block, and the computation, by this same guidance block, of the set point value for the corresponding derivative variable.

(B) Another way of generating said desired process output trajectory is to select it equal to a straight line that, in the plane of evolution of the process output variable versus discrete time shown in FIG. 2, would link the value at instant t of the process output variable, $v(t)$, with said set point value $SP_v(t)$, in such a way that the slope of said straight line will be determined by an increment $Vc(t+1)$ approaching the set point value over an updating period of time, that is to say, between updating instants t and t+1. This increment $Vc(t+1)$ can be computed as follows:

(i) The approaching increment $Vc(t+1)$ must be equal to a maximum value $V_s$, as long as the distance between the value of the process output variable, $v(t)$, and the set point value, $SP_v(t)$, is bigger than the product of $V_s$ by a number $T_f$, that is to say, always while said straight line with slope equal to $V_s$ per updating period would reach said set point value in more than $T_f$ updating periods.

(ii) When the distance between the process output variable $v(t)$ and the set point $SP_v(t)$ is lower than the product $V_s \times T_f$, the approaching increment $Vc(t+1)$ will be computed by $$Vc(t+1) = |SP_v(t) - v(t)|/T_i \qquad (5)$$

where $T_i$ is a number of updating periods. The computation of $Vc(t+1)$ by (5) means that the desired process output trajectory at t will reach the set point $SP_v(t)$ in $T_i$ updating periods.

From the previously computed $Vc(t+1)$, the value of $v_d(t+1)$ is obtained by $$v_d(t+1) = v(t) + Vc(t+1) \qquad (6)$$

The guidance block parameters $V_s$, $T_f$ and $T_i$ are chosen by the guidance block designer to make the evolution of the process output variable $v(t)$ converge in a desired manner towards the set point $SP_v(t)$ generated directly by the operator.

FIG. 2 shows how the process output variable v would approach the set point value $SP_v$ following the values $v_d(t+1)$ produced by the guidance block according to (6) at the different updating instants. This design of the guidance block has been used in the illustrative example presented in this document.

2. Computation of the set point value, $SP_{\dot{v}}(k+1)$, for the derivative variable by:

$$\Delta v_d(t) = v_d(t+1) - v(t) \qquad (7)$$

$$SP_{\dot{v}}(k+1) = F(\Delta v_d(t)) \qquad (8)$$

where function F is the same previously considered in (2).

(d) Computation of the control signal u(k) by the model based advanced controller 7. This controller computes the control signal u(k) from the value of the derivative variable to be controlled, v̇(k), and its set point value at k+1, $SP_{\dot{v}}(k+1)$, and executing a well known sequence of operations such as that described in U.S. Pat. Nos. 4,197,576 and 4,358,822 for adaptive predictive controllers or that described in the U.S. Pat. No. 6,662,058 B1 for adaptive predictive expert controllers.

In its implementation, the guidance system of the present invention can be applied to a scalar process output variable, v(k), as previously considered, or to a process output variable vector, v(k), composed of n scalar output components, which are n scalar process output variables. In this case, the guidance system can be applied to each one of said n scalar output components, as previously described, but taking into account that in this multi-input multi-output case, said model based advanced controller will be a multi-input multi-output model based advanced controller for the derivative vector, v̇(k), composed of n scalar derivative components which are the derivative variables of each of said n scalar output components. Said multi-input multi-output model based advanced controller will compute a control vector, u(k), to be applied to the apparatus that carries out the process, this computation taking into account the interactions between the components of said derivative vector and said control vector.

Likewise, the guidance system of the present invention can be applied using adaptive predictive controllers or adaptive predictive expert controllers, but also can be applied using other types of model based advanced controllers that have been described widely in many books and publications.

On the other hand, the guidance system of the present invention can be implemented by an augmented system with cascade strategies. When the set point of the guidance system $SP_v(t)$ is generated by a master controller of the augmented system, this would be the case of a cascade strategy with a slave guidance system. When the control signal u(k), generated within the augmented system by a model based advanced controller of a guidance system, is applied as set point to another slave controller or guidance block, this would be the case of an augmented system implementing a cascade strategy with a master guidance system.

Experimental Example: Guidance System Applied to the Pitch Angle Control of a Simulated Aircraft To illustrate the guidance system of the present invention, it has been applied to the pitch angle control of a simulated aircraft. The JSBSim Flight Dynamics Model, a well-known flight simulator executed within the FlightGear generic simulation environment, has been used for this purpose. The elevator position of the simulated aircraft was the control signal generated by the guidance system. Likewise, the same adaptive predictive controller used in the previously considered guidance system was applied, in the same simulation environment, for controlling the same pitch angle, with the aim of realizing a comparative analysis of results.

The simulated aircraft is an "Unmanned Aerial Vehicle" (UAV) which has a mass of 340 kg, 8 m of wingspan, 4.6 m of length and 1.26 m of height. The longitudinal distance from 25% of aerodynamic mean chord to the gravity center is 42.4 mm; the gravity center is found in the aircraft symmetric plane, and the vertical distance from the fuselage reference line to the gravity center is 22.5 mm. Moments and products of inertia are: $I_{xx}$=248.76 $kgm^2$; $I_{yy}$=331.587 $kgm^2$; $I_{zz}$=548.627 $kgm^2$; $P_{xz}$=21.8044 $kgm^2$, y $P_{xy}$=$P_{yz}$=0 $kgm^2$.

Figure 3A:
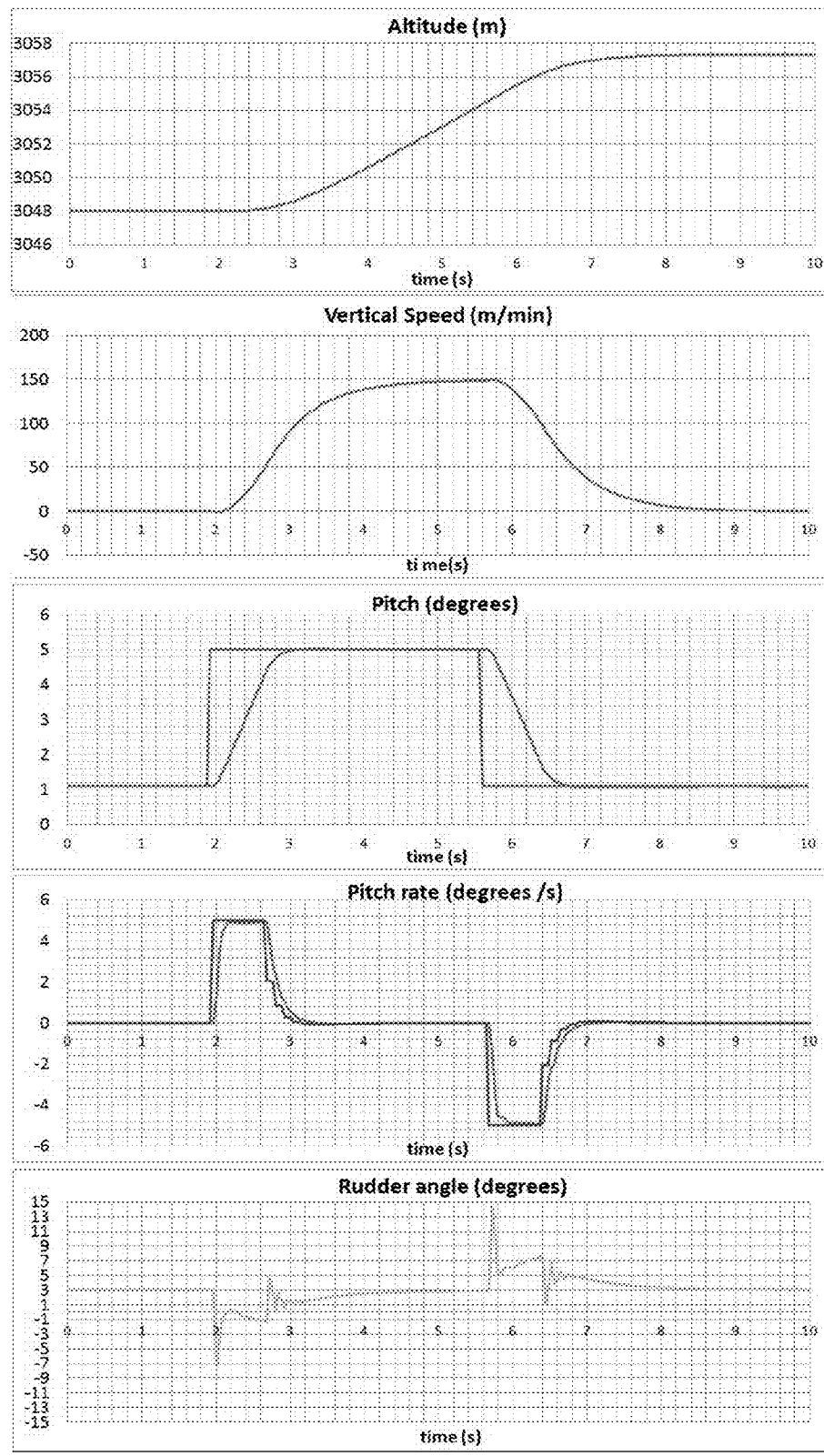
FIG. 3a shows the results of an experiment in which the guidance system was applied to the pitch angle of a simulated aircraft. In this particular application, the guidance block, whose operation was illustrated in FIG. 2, was used together with an adaptive predictive controller by the guidance system.

The initial steady state flight conditions for the experiment, whose results are shown in FIG. 3a, were 3048 m of altitude and 128 km/h of aerodynamic speed. A change of the pitch angle from 1° to 10° was performed under guidance system control, and then the pitch angle set point was held at this last value for 3 seconds before it was returned to the initial value of 1°. The elevator range of actuation was limited to [−20, 20] degrees of deflection.

In accordance with the detailed description of the invention, the guidance system has used a guidance block and an adaptive predictive controller described in U.S. Pat. No. 4,358,822. This guidance block computes the desired output trajectory for the pitch angle, and calculates the set point value for the derivative variable, i.e. the pitch rate, in accordance with alternative (B) of the detailed description of the invention. The updating period was 120 ms and the values of the guidance block parameters, Vs, Tf and Ti, were chosen equal to 0.6 degrees per updating period, 2 and 3 updating periods, respectively.

The sequence of operations of the adaptive predictive controller used by the guidance system was that described in U.S. Pat. No. 4,358,822, under the following setting: (i) the control period was 40 ms, that is to say, a third of the guidance block updating period, matching the updating of the control period one every three control periods; (ii) the prediction horizon was equal to 1 control period; (iii) the driver block parameters were equal to those of a second order model with a time constant equal to a control period, a gain and a damping ratio equal to 1, and (iv) the single-input single-output adaptive predictive model had two $a_i$ parameters and three $b_i$ parameters.

Figure 3B:
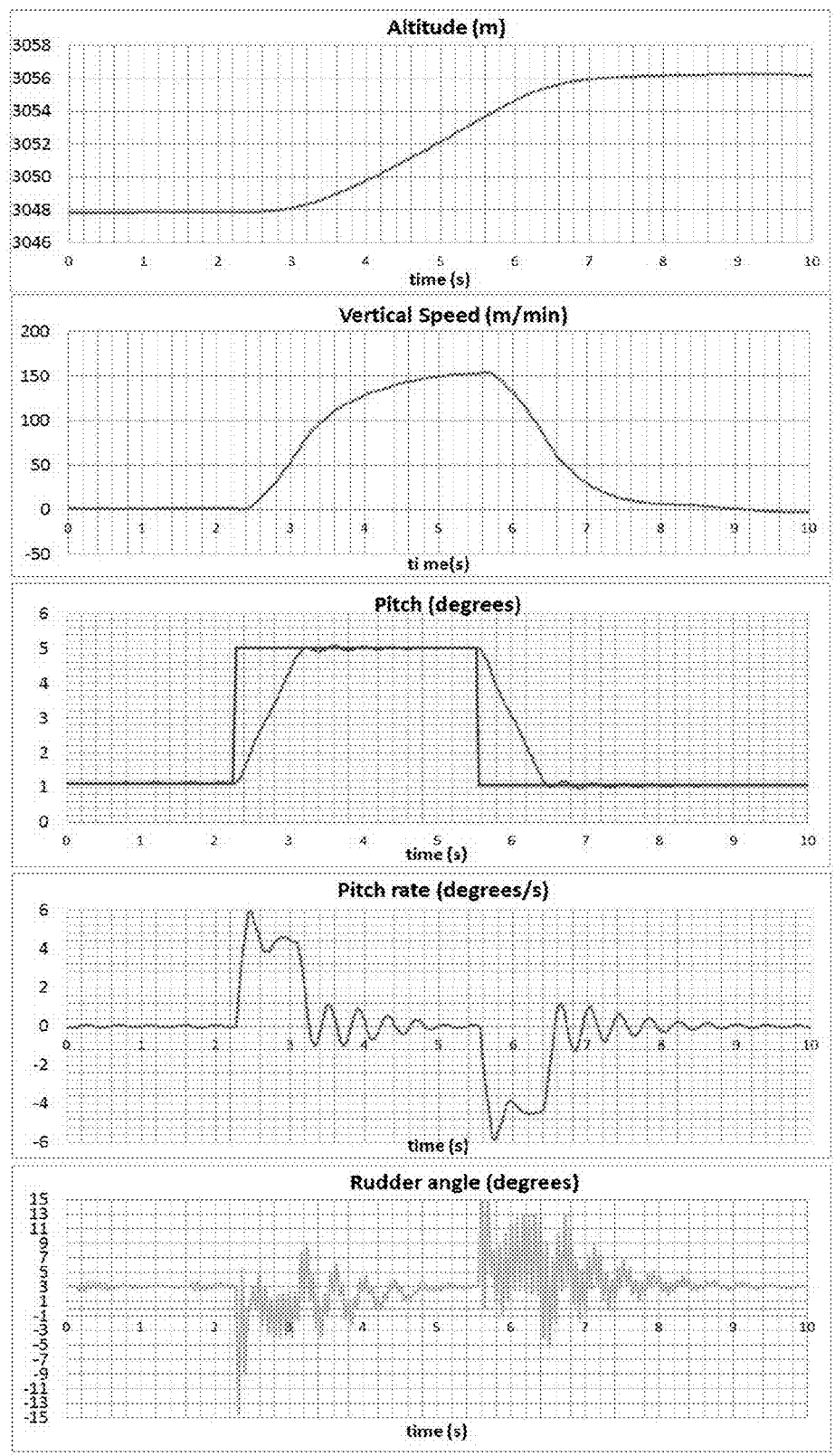
FIG. 3b shows the results of a similar experiment to that of FIG. 3a, but in which the same adaptive predictive controller used by the guidance system was directly applied to the pitch angle of the same simulated aircraft in the same context considered in FIG. 3a, in order to comparatively evaluate the guidance system performance.

The experiment, whose results are shown in FIG. 3b, was carried on the same initial steady state flight conditions, and tried to achieve the same changes in pitch angle as that presented in FIG. 3a. However, in this case, the pitch angle control was performed, not by the guidance system previously described, but by an adaptive predictive controller with equivalent setting to that used in said guidance system for controlling the pitch rate, since the slope of the pitch angle desired trajectory generated by driver block of the adaptive predictive controller, is limited to the absolute value of 5°/s. This limitation matches the maximum slope of the pitch angle desired trajectory generated by the guidance block in the experiment of FIG. 3a.

Discussion of the Results and Conclusions

The trend curves in FIGS. 3a and 3b show, from top to bottom, the time evolution of altitude, rate of climb, pitch angle, pitch rate, and elevator position from each one of the experiments, respectively.

It can be observed that the control performance shown in FIG. 3a by the guidance system is excellent; no angular accelerations that can cause vibrations in the aircraft longitudinal axis are noticed in the pitch rate. On the other hand, control actions over the elevator position are smooth, with a minimum wear for the elevator.

This control performance overcomes that of the adaptive predictive controller shown in FIG. 3b, where significant oscillations can be noticed in the pitch rate causing vibrations in aircraft longitudinal axis and drastic control actions over the elevator position.

Thus, the previous experiments show that, although the adaptive predictive controller can achieve excellent control performance for longer control periods, for control periods in the range of those used in these experiments, its control performance deteriorates but is improved by that obtained by the guidance system of the present invention.

What is claimed is:

1. A method for generating a control vector during each of a plurality of control instants k, said control vector to be applied to an apparatus which carries out a process with at least one input variable and at least one output variable, at least one of said input variables defining a process input vector and at least one of said output variables defining a process output vector, said apparatus varying said process input vector in accordance with the value of said control vector u(k), said method guiding said process output vector v(k) towards an output set point vector, said method comprising the steps of:
   (A) Generating a derivative vector $\dot{v}(k)$ from said process output vector;
   (B) Generating a future predetermined trajectory for driving said process output vector towards said output set point vector with a predetermined dynamic;
   (C) Computing from said predetermined trajectory a derivative set point vector $SP\dot{v}(k)$ for said derivative vector;
   (D) Using an adaptive predictive controller for computing said control vector u(k), based upon components of the derivative vector and their corresponding derivative set points, that will drive said derivative vector $\dot{v}(k)$ to said derivative set point vector $SP\dot{v}(k)$ and, as a consequence, said output vector towards said predetermined trajectory, said adaptive predictive controller using an adaptive-predictive model to compute said control vector u(k) that will cause the predicted derivative vector to be at some value of said predetermined trajectory at a future time instant, being the parameters of said adaptive-predictive model updated on a real time basis in a manner which will cause said predicted derivative vector to approach the actual derivative vector;
   (E) Applying said control vector u(k) to said apparatus in a manner which will cause said apparatus to vary said input vector in accordance therewith; and
   (F) Actuating control of the process with said apparatus based on said at least one input variable.

2. The method of claim 1, wherein said method is characterized by controlling with a predetermined dynamic and simultaneously said process output vector v(k) and a derivative vector $\dot{v}(k)$ of said process output vector.

3. The method of claim 1, wherein computing the future predetermined trajectory for each component of the output vector comprises taking into account the predetermined dynamics for said process and is performed as a function of both the output set point vector and the output vector.

4. The method of claim 3, wherein said predetermined trajectory for one of the components of said output vector is determined by an approaching increment towards a corresponding component of the output set point vector within a next updating period, when one of the said components of the output vector differs more than a certain distance from said corresponding component of the output set point vector, since said variable approaching increment is progressively reduced when one of the said components of the output vector approaches said corresponding component of the output set point vector within said certain distance.

5. A guidance system comprising a computer controller for generating a control vector during each of a plurality of control instants k, said control vector to be applied to an apparatus which carries out a process with at least one input variable and at least one output variable, at least one of said input variables defining an process input vector and at least one of said output variables defining a process output vector, said apparatus varying said process input vector in accordance with the value of said control vector u(k), said system guiding said process output vector v(k) towards an output set point vector SPv(k), said computer controller being configured by a set of instructions to operate as:
   a. a computation block responsive for generating a derivative vector V (k) from said process output vector v(k);
   b. a guidance block responsive for: (i) generating a future predetermined trajectory for driving said process output vector v(k) towards said output set point vector SPv(k) with a predetermined dynamic; and (ii) computing from said future desired trajectory a derivative set point vector $SP\dot{v}(k)$ for said derivative vector $\dot{v}(k)$; and
   c. an adaptive predictive controller for computing said control vector u(k), based upon components of the derivative vector and their corresponding derivative set points, that will drive said derivative vector $\dot{v}(k)$ to said derivative set point vector $SP\dot{v}(k)$ and, as a consequence, said process output vector towards said predetermined trajectory, said adaptive predictive controller using an adaptive-predictive model to compute said control vector u(k) that will cause the predicted derivative vector to be at some value of said predetermined trajectory at a future time instant, being the parameters of said adaptive-predictive model updated on a real time basis in a manner which will cause said predicted derivative vector to approach the actual derivative vector,
   wherein said control vector u(k) is applied to said apparatus in a manner which will cause said apparatus to vary said input vector in accordance therewith, and wherein control of the process with said apparatus is actuated based on said at least one input variable.

* * * * *